Figure 1:
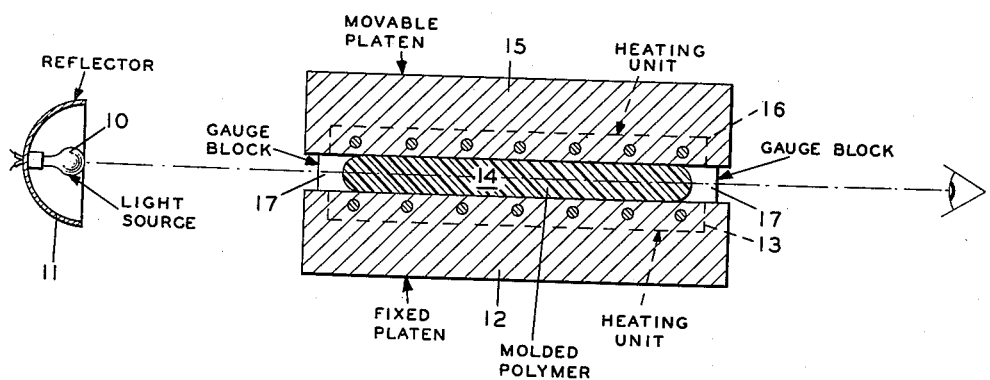

Nov. 11, 1952 L. C. RUBIN 2,617,149
METHOD OF FORMING SHEETS FROM PERFLUOROCHLOROCARBON PLASTIC
Filed Dec. 31, 1949

INVENTOR.
LOUIS C. RUBIN
BY
ATTORNEYS

Patented Nov. 11, 1952

2,617,149

UNITED STATES PATENT OFFICE 2,617,149

METHOD OF FORMING SHEETS FROM PERFLUOROCHLOROCARBON PLASTIC

Louis C. Rubin, West Caldwell, N. J., assignor to The M. W. Kellogg Company, Jersey City, N. J., a corporation of Delaware Application December 31, 1949, Serial No. 136,199

8 Claims. (Cl. 18—55)

This invention relates to the treatment of perfluorochlorocarbon plastics. In one aspect, the invention relates to the treatment of polytrifluorochloroethylene plastics. In another aspect, the invention relates to the molding of polymers of trifluorochloroethylene in forming sheets of such material without the use of dies.

The preparation of the monomer, trifluorochloroethylene, is accomplished by dechlorinating Freon 113 (1,1-2 trifluorotrichloroethane), under suitable conditions of dehalogenation in the presence of a solvent, such as methyl alcohol, and a metallic dehalogenating agent, such as zinc dust, to produce an effluent comprising the monomer trifluorochloroethylene, including unreacted trifluorochloroethylene and solvent. This effluent is next passed to a suitable fractional distillation system in which substantially pure trifluorochloroethylene is recovered as a relatively low boiling fraction.

The monomer thus obtained is polymerized under suitable polymerization conditions, with or without the presence of a suitable catalyst or promoter. Such conditions may comprise the use of a suitable catalyst comprising an organic peroxide, such as bis-trichloroacetyl peroxide preferably dissolved in a suitable solvent, such as trichlorofluoromethane, at a temperature between about $-20°$ C. and about $25°$ C., and preferably at a temperature of about $-16°$ C. At a temperature of about $-16°$ C. the polymerization of trifluorochloroethylene to the solid polymer in a suitable yield is accomplished in about seven days. At elevated temperatures, less time is required to complete the polymerization. After the desired extent of polymerization, the resulting polymerization reaction mixture is removed from the polymerization zone and the polymeric product is recovered from the solvent for the catalyst or polymerizing agent.

The polymers of trifluorochloroethylene possess certain desirable, physical and chemical characteristics, with four-fifths of the weight being supplied by the halogens, fluorine and chlorine. These polymers are colorless, transparent, and have been found to possess a high chemical stability, with no effect being observed on the polymer after prolonged exposure to concentrated sulfuric, hydrofluoric and hydrochloric acid, strong caustic, fuming nitric acid, aqua regia, and other vigorous oxidizing materials. The polymer is hard but not brittle and is flowable at temperatures above about $500°$ F. In addition, the polymer is flexible and resilient, and is not wetted by water or affected by high humidity. However, great care and a novel method of molding are required in forming molded sheets of these plastics, inasmuch as they tend to change their physical characteristics to varying degrees under the influence of the molding temperature.

It is an object of this invention to provide an improved method of molding polymers of trifluorochloroethylene in forming sheets without the use of dies.

Various other objects and advantages of the present invention may be apparent to those skilled in the art from the accompanying description and disclosure.

The accompanying drawings of the present invention, illustrate the techniques of operation in molding polymers of trifluorochloroethylene without the use of dies. Figure 1 is a front view, partly in cross-section, of apparatus employed for molding the polymer and determining when plastification is complete, as hereinafter discussed. Figure 2 is a graph used for determining the required gauge block thickness to obtain sheets of the trifluorochloroethylene molded polymer of desired thickness, also hereinafter discussed.

In molding sheets of plastic material, a suitable quantity of the plastic compound, prepared in granular or powdered form, in accordance with the usual practice, is placed on a polished surface which is heated to a suitable molding temperature. Gauge blocks, of a thickness appropriate to the thickness desired, in the molding sheet are placed on the polished surface at the sides thereof. A polishing plate is then placed above the plastic mass in position to bear on the gauge blocks when pressed down. Molding is then carried out in a suitable press.

In accordance with this invention, sheets of the polymers of trifluorochloroethylene are molded in the above manner without the use of dies, by careful selection of molding temperature, in the range of $415°$ F. to $560°$ F., the molding temperature being selected by reference to physical properties and/or molecular weight of the polymer. Preferably the gauge blocks are somewhat thicker than the desired sheet thickness to allow for shrinkage upon subsequent cooling.

Polymers of trifluorochloroethylene of varying molecular weight may be produced by the method described above, by suitable control of conditions in polymerization. In molding sheets of such polymers, in accordance with this invention, the molding temperature is carefully selected by reference, directly or indirectly, to the molecular weight of the polymer to be molded. Temperatures in the range of 415° F. to 560° F. are satisfactory, but best results are obtained by selecting a molding temperature within this range which is the optimum temperature for the particular polymer being molded.

It is impractical to ascertain the molecular weight for each polymer to be molded under normal circumstances. Accordingly, a simple test has been devised which provides a direct indication of the proper molding temperature. This test comprises measurements of the temperature at which no tensile strength is exhibited under the conditions of the test. This test is applied to standard or test pieces of the plastic material. This temperature is referred to as the "no strength temperature" or "no strength temperature value," and is abbreviated N. S. T. Accordingly, the N. S. T. value serves as a useful guide in the molding of plastics, and has particular applicability to plastics composed essentially of polytrifluorochloroethylene.

The measurement of the N. S. T. value is carried out in suitable apparatus on a strip of the plastic measuring 2" by 1/8" by 1/16". Conveniently such strips may be notched or grooved in a straight line across one large surface at the center transversely to the longitudinal axis. The notch or groove is made perfectly straight and extended to a depth of 1/64". The strength test is then applied to the point of minimum cross-section. The sample is suspended vertically, with a small weight (approximately 4" long), suspended from the lower end of the test strip on a fine wire. The above-mentioned weight is so adjusted that the total weight from the notch down is 0.5 gram. The test piece is suspended in a suitable chamber whose internal temperature is brought up to 410° F. The temperature is then raised at a rate of 2.7° F. per minute until the sample pulls apart at the notch. The N. S. T. value is the temperature at which the test strip is pulled in two. This determination is not highly sensitive to small variations in test strip thickness (±0.003"), however care must be taken to cut a sharp clean notch of uniform depth. Differences of 10° F. are normally considered significant.

In carrying out the molding of polytrifluorochloroethylene under the aforementioned conditions of temperature and pressure, the optimum operating conditions are determined by reference to the particular N. S. T. value of the polytrifluorochloroethylene plastic treated. The N. S. T. value of the polytrifluorochloroethylene plastics vary from about 220° C. to about 350° C. and these polymers may be satisfactorily treated under the above range of operating conditions. In general, it has been found that as the N. S. T. value increases the molding temperature should also be increased (if the pressure is the same) to insure the best results. An operating temperature range between about 470° F. and about 520° F. is preferred with a compacting pressure preferably between about 500 and about 1,500 pounds per square inch, although pressures as high as 20,000 pounds per square inch may also be employed. Thus a polytrifluorochloroethylene plastic having an N. S. T. value of 240° C. can be satisfactorily pressed within the preferred compacting pressure range between about 500 and about 1,500 pounds per square inch, at a temperature between about 470° F. and about 485° F.; while a polymer having an N. S. T. value of 270° C. is satisfactorily pressed at a temperature between about 485° F. and about 500° F., within the preferred pressure range. Similarly, a polymer having an N. S. T. value of 300° C. is satisfactorily pressed at a temperature between about 500° F. and about 510° F. within the preferred pressure range. The polytrifluorochloroethylene plastic having a relatively low N. S. T. value such as 240° C. flows easier at the molding temperature and produces a relatively harder finished sheet, while the polymers having a relatively high N. S. T. value such as 300° C. are more viscous at the molding temperature but produce a more flexible finished sheet.

The particular pressing time required for completely converting the stock and forming the finished sheet under selected operating conditions of temperature and pressure and determined by the respective N. S. T. values, is based upon the time required for plastification to be complete when the press is closed and the molding cycle is started. To determine when plastification is complete a simple test has been devised, as shown in Figure 1 of the accompanying drawing which is a front view partly in cross-section, in which an electric light 10 equipped with a reflector 11 is placed in the rear of the press (not shown) and level with the surface of the fixed polishing plate 12 equipped with heating unit 13. By looking through the stock or molded polymer 14 with movable platen 15 (equipped with heating unit 16), bearing thereon from the side opposite to the position of the light 10, a color change in the stock 14 will be noticed as its temperature rises. At first the stock assumes a light pink color which gradually changes to the color of white light when the point of complete conversion is reached. As previously indicated the plastic sheet 14 produced by the aforementioned molding operation after the cycle is complete, is slightly greater than the desired thickness. Such procedure is made necessary by reason that subsequent cooling or quenching of the hot molded sheet tends to bring about a reduction in thickness. Accordingly, the use of gauge blocks 17 slightly thicker than the desired thickness of the final finished plastic sheet, is indicated. In this respect, it has been found that a definite fixed relationship exists between gauge block thickness and the desired thickness of the final finished plastic sheet. Reference is therefore had to Figure 2 in the accompanying drawing which shows a graph obtained by plotting the desired sheet thickness, as abscissae, against the required gauge block thickness, as ordinates. It will be noted from the graph that the relationship existing between gauge thickness and desired sheet thickness is a straight line function in which the thickness of the gauge block selected for the molding operation is about 1.25 times greater than that of the desired thickness of the final plastic sheet. The following table indicates typical gauge block thicknesses required to produce a finished plastic sheet (after the cooling or quenching operation) which has the desired thickness.

| Gauge Block—Inches | Finished Sheet—Inches— |
|---|---|
| 0.050 | 0.040 |
| 0.100 | 0.080 |
| 0.150 | 0.120 |
| 0.200 | 0.160 |
| 0.250 | 0.200 |
| 0.300 | 0.240 |

It is, therefore, possible to calculate intermediate, higher or lower thicknesses of the required gauge blocks either from the graph or by applying the formula in which the required gauge block thickness should be about 1.25 times greater than the desired thickness of the final plastic sheet after the cooling operation.

In the description of the operating conditions for the above-mentioned molding of sheets without a die, the stock to be treated has been referred to as a plastic composed essentially of polytrifluorochloroethylene. It should be understood, however, that fillers and plastic compositions other than the polymers of the present invention which do not materially affect the characteristics of polytrifluorochloroethylene may also be incorporated in the plastic material treated, and that the treatment of such compositions is also within the scope of this invention. In this respect, it has also been found desirable to incorporate plasticizing agents with the polytrifluorochloroethylene plastic to be molded, employing such plasticizers as polytrifluorochloroethylene itself but in an oily or waxy state. When incorporating such plasticizing agents with the polytrifluorochloroethylene plastic to be molded, it is possible to employ the lower temperatures within the aforementioned ranges for a given N. S. T. value of polytrifluorochloroethylene. From an economic standpoint, it is generally preferred to conduct the molding operation at as low a temperature as possible.

In carrying out the aforementioned molding of sheets of polytrifluorochloroethylene plastics, conventional apparatus for molding plastic sheets without a die is empoyed which is familiar to those skilled in the art, and since the novelty of the present invention does not reside in the molding apparatus employed, further description thereof is unnecessary. It is preferred, however, that the platens be electrically heated. The polishing plates of the platens are preferably highly polished stainless steel plates or thin gauged ferro-type plates having a thickness of approximately 0.020", reinforced with heavy gauge steel backing plates, having a thickness of approximately 0.050".

In conducting the molding operation, a previously determined weight of the polytrifluorochloroethylene plastic stock, preferably in granular form, is placed on the polished surface of the platen. It is preferred that this polished plate be first brought up to a temperature between about 225° F. and about 300° F., before the actual molding cycle is begun, in order to avoid possible abrasion of the surface of the polishing plate by contact with the relatively rough polytrifluorochloroethylene plastic granules, and also to reduce the time required to plasticize the polymer in the actual molding operation. If so desired, the stock may be separately preheated in an oven at a temperature substantially below the conversion temperature and it is desirable to hold the polished surface at such temperature for about an hour before the actual molding cycle is begun.

With appropriate gauge blocks placed on two sides of the polishing plate upon which the granular mass of the plastic is retained, a second polishing plate is brought to bear upon the granular mass, with the upper plate so aligned that it will bear upon the gauge blocks when the press is closed. The press is slowly closed at the rate of about 0.2" per minute at the selected molding temperature, with proper pressure maintained within the aforementioned range, which is preferably between about 500 and about 1,500 pounds per square inch. After conversion is complete the plastic sheet may be removed from the press.

As previously indicated the sheet thus obtained is slightly greater than the desired thickness and must be positively cooled in order to reduce this thickness. While cooling of this sheet may be that which is caused by contact of the sheet with the atmosphere, it is desirable however to positively cool this sheet by quenching in water. Such cooling may be effected either by actually immersing the sheet in water or transferring the assembly of the aforementioned upper and lower polishing surfaces to cool press platens. In the latter case, sufficient pressure is employed in bringing the cooled polishing plates in contact with the gauge blocks to maintain a suitable pressure within the aforementioned operating range.

The aforementioned rapid cooling of the formed plastic sheet is desirable in order to limit crystallization. Such limitation of the degree of crystallization will affect the physical properties of the molded sheet produced from the polytrifluorochloroethylene plastic. These properties have been found to vary from those of an amorphous material to those of a crystalline material. The amorphous material is transparent, softer, tougher and more flexible than the crystallized material. The latter tends to be milky in appearance and hard and resistant to distortion. The degree of crystallization is determined primarily by the rapidity with which the molded polymer sheet is cooled to approximately 300° F. or below, from its transition temperature. The melt viscisity of the polymer to be molded effects the rate of crystallization, so that the higher the N. S. T. value, the lower the rate of crystallization. Similarly, when the N. S. T. value is lowered, the rate of crystallization will be more rapid so that the cooling operation should be more rapid if it is desired to avoid or limit crystallization. For example, quenched polytrifluorochloroethylene plastic having an N. S. T. value of 220° C., while flexible and useful as a film at room temperature will crystallize fairly rapidly at temperatures as low as 250° F. and become brittle. Quenched polytrifluorochloroethylene plastic with an N. S. T. value of 270° C. will show comparatively little change on heating to the same temperature for prolonged periods; and even if crystallized by heating at relatively higher temperatures, still retains its toughness.

While a particular embodiment of the present invention has been described for purposes of illustration, it should be understood that various modifications and adaptations thereof, which will be obvious to one skilled in the art may be made within the spirit of the invention without departing from its scope.

I claim:

1. A method for forming sheets without a die from a thermoplastic polymer of trifluorochloroethylene which comprises placing the plastic between pressing platens containing a gauge block, compressing said plastic between said pressing platens under sufficient elevated pressure to close said platens against said gauge block at an elevated temperature sufficient to mold said plastic into a sheet, after closing said platens against said gauge block to form the molded sheet maintaining the elevated temperature and pressure at least until a color change indicative of plastification is noted, and thereafter cooling said molded sheet.

2. A method for forming sheets without a die from a thermoplastic polymer of trifluorochloroethylene having an N. S. T. value between about 220° C. and about 350° C. which comprises placing the plastic between pressing platens containing a gauge block, compressing said plastic between said pressing platens at a pressure between about 500 and about 20,000 pounds per square inch to close said platens against said gauge block at a temperature between about 415° F. and about 560° F. to mold said plastic into a sheet, after closing said platens against said gauge block to form the molded sheet maintaining said temperature and pressure at least until a color change indicative of plastification is noted, and thereafter cooling said molded sheet.

3. A method for forming sheets without a die from a plastic composed essentially of polytrifluorochloroethylene having an N. S. T. value between about 220° C. and about 350° C. which comprises placing the plastic between pressing platens containing a gauge block, compressing said plastic between said pressing platens at a pressure between 500 and about 1500 pounds per square inch to close said platens against said gauge block at a temperature between about 415° F. and about 560° F. to mold said plastic into a sheet, after closing said platens against said gauge block to form the molded sheet maintaining said temperature and pressure at least until a color change indicative of plastification is noted, and thereafter cooling said molded sheet.

4. A method for forming sheets without a die from a plastic composed essentially of polytrifluorochloroethylene having an N. S. T. value between about 240° C. and about 350° C. which comprises placing the plastic between pressing platens containing a gauge block, compressing said plastic between said pressing platens at a pressure between 500 and about 1500 pounds per square inch to close said platens against said gauge block at a temperature between about 470° F. and about 520° F. to mold said plastic into a sheet, after closing said platens against said gauge block to form the molded sheet maintaining said temperature and pressure at least until a color change indicative of plastification is noted, and thereafter cooling said molded sheet.

5. A method for forming sheets without a die from a plastic composed essentially of polytrifluorochloroethylene having an N. S. T. value between about 240° C. and about 300° C. which comprises placing the plastic between pressing platens containing a gauge block, compressing said plastic between said pressing platens at a pressure between 500 and about 1500 pounds per square inch to close said platens against said gauge block at a temperature between about 415° F. and about 560° F. to mold said plastic into a sheet, after closing said platens against said gauge block to form the molded sheet maintaining said temperature and pressure at least until a color change indicative of plastification is noted, and thereafter cooling said molded sheet.

6. A method for forming sheets without a die from a plastic composed essentially of polytrifluorochloroethylene having an N. S. T. value of about 240° C. which comprises placing the plastic between pressing platens containing a gauge block, compressing said plastic between said pressing platens at a pressure between 500 and about 1500 pounds per square inch to close said platens against said gauge block at a temperature between about 470° F. and about 485° F. to mold said plastic into a sheet, after closing said platens against said gauge block to form the molded sheet maintaining said temperature and pressure at least until a color change indicative of plastification is noted, and thereafter cooling said molded sheet.

7. A method for forming sheets without a die from a plastic composed essentially of polytrifluorochloroethylene having an N. S. T. value of about 270° C. which comprises placing the plastic between pressing platens containing a gauge block, compressing said plastic between said pressing platens at a pressure between 500 and about 1500 pounds per square inch to close said platens against said gauge block at a temperature between about 485° F. and about 500° F. to mold said plastic into a sheet, after closing said platens against said gauge block to form the molded sheet maintaining said temperature and pressure at least until a color change indicative of plastification is noted, and thereafter cooling said molded sheet.

8. A method for forming sheets without a die from a plastic composed essentially of polytrifluorochloroethylene having an N. S. T value of about 300° C. which comprises placing the plastic between pressing platens containing a gauge block, compressing said plastic between said pressing platens at a pressure between 500 and about 1500 pounds per square inch to close said platens against said gauge block at a temperature between about 500° F. and about 520° F. to mold said plastic into a sheet, after closing said platens against said gauge block to form the molded sheet maintaining said temperature and pressure at least until a color change indicative of plastification is noted, and thereafter cooling said molded sheet.

LOUIS C. RUBIN.

REFERENCES CITED

The following references are of record in the file of this patent:

UNITED STATES PATENTS

| Number | Name | Date |
| --- | --- | --- |
| 2,099,976 | Hagedorn | Nov. 23, 1937 |
| 2,219,700 | Perrin et al. | Oct. 29, 1940 |
| 2,325,060 | Ingersoll | July 27, 1943 |
| 2,452,761 | Jesionowski | Nov. 2, 1948 |

FOREIGN PATENTS

| Number | Country | Date |
| --- | --- | --- |
| 578,168 | Great Britain | June 18, 1946 |

OTHER REFERENCES

"New High Temperature Thermoplastic" Modern Plastics, October 1948, pages 168, 170, 172.